Oct. 27, 1964   O. N. LAWRENCE   3,153,908
VEHICLE HYDRAULIC TRANSMISSION MECHANISMS
Filed June 12, 1961

United States Patent Office 3,153,908
Patented Oct. 27, 1964

3,153,908
VEHICLE HYDRAULIC TRANSMISSION MECHANISMS
Owen Napier Lawrence, Great Alne, near Alcester, England, assignor to Joseph Lucas (Industries) Limited, Birmingham, England
Filed June 12, 1961, Ser. No. 116,455
Claims priority, application Great Britain June 22, 1960
4 Claims. (Cl. 60—53)

This invention relates to hydraulic transmission mechanism for vehicles, and of the kind comprising a pair of hydraulic motors for driving a pair of wheels at opposite sides of the vehicle respectively, and a pump adapted to be driven by the engine of the vehicle, and for supplying motive power to the pair of motors respectively.

In such mechanisms a problem arises in providing differential movement of the driven wheels when the vehicle is negotiating a turn, and the object of the present invention is to incorporate means for overcoming this problem in a convenient manner.

According to the invention, in a vehicle hydraulic transmission mechanism of the kind specified the motors are both of the variable stroke type, and each motor has associated therewith means movable in response to a change in the pressure drop across the motor whereby in the event of one motor tending to rotate faster than the other, as for example, when the vehicle is negotiating a turn, the stroke of at least one of the motors will be changed to maintain the flow substantially constant for a given pump output pressure.

Figure 1:
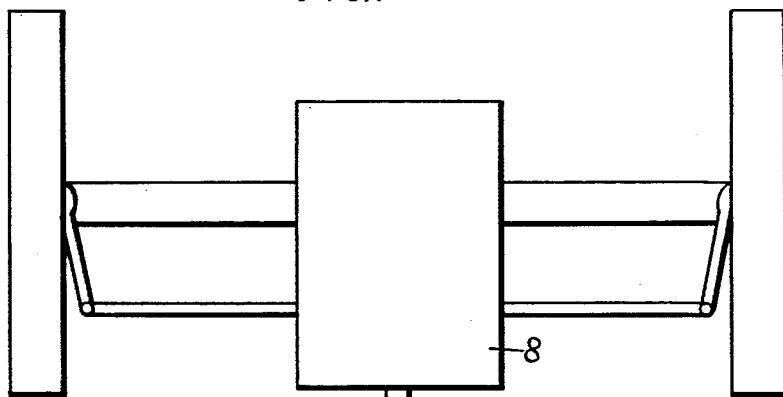
Figure 2:
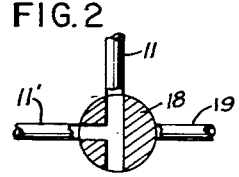
Figure 3:
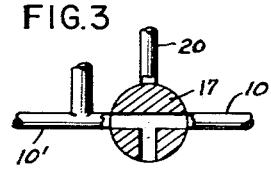
Figure 4:
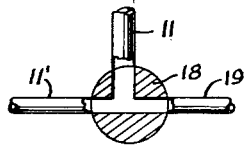
Figure 5:
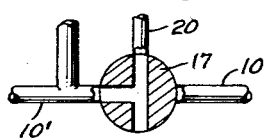
Figure 5:
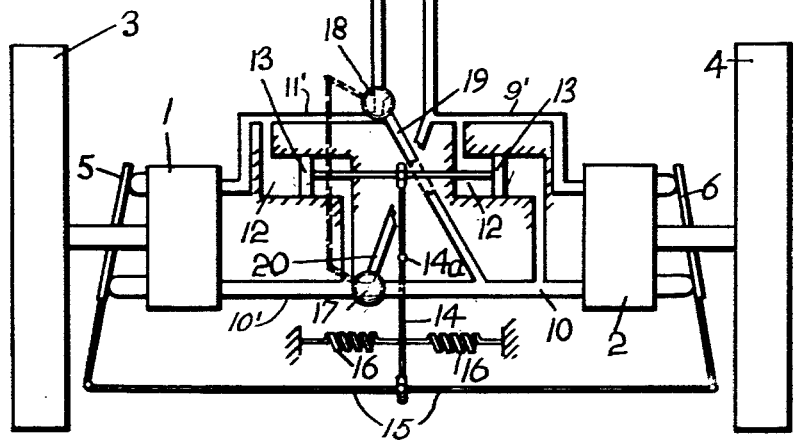

FIG. 1 is a diagrammatic view showing a hydraulic transmission mechanism for a vehicle constructed in accordance with this invention;

FIGS. 2 and 3 are diagrammatic views showing the positions of the control valves for series operation of the motors 1 and 2; and FIGS. 4 and 5 are diagrammatic views showing the positions of the control valves for parallel operation of the motors.

Referring to the drawing, there is provided a pair of hydraulic motors 1 and 2 for driving a pair of wheels 3 and 4 at opposite sides of the vehicle respectively. The motors 1 and 2 are of the variable stroke type and are conveniently of the swash plate type (as shown) having angularly adjustable cam plates, 5 and 6 respectively. Motive liquid is supplied to the motors 1 and 2 in series by a variable stroke pump 7 driven by the engine 8 of the vehicle. For this purpose, the outlet of the pump 7 is connected through a pipe 9 to the inlet of the motor 2 and the outlet of the motor 2 is connected through a pipe 10 to the inlet of the motor 1, whilst the outlet of the motor 1 is connected through a pipe 11 to the inlet of the pump 7.

Associated with each motor respectively is one of a pair of devices for sensing the pressure drop across the motor. Each device comprises a cylinder 12 containing a diaphragm or (as shown) a piston 13, one end of the cylinder being connected to the inlet of the associated motor, and the other end of the cylinder being connected to the outlet of the associated motor. Moreover, connected to the piston is a lever which is linked to the cam plate of the associated motor in such a manner that, in the event of the speed of this motor being reduced relative to the speed of the other motor (as, for example, when the vehicle is negotiating a turn) the stroke of the motor having the reduced speed will be increased to maintain the flow of liquid substantially constant for a given pump output.

Where (as shown) it is required that the change of speed should be divided between the pair of motors to provide a normal differential action, the piston 13 of the two devices are connected to a common lever 14 pivoted at 14a and connected by means of links 15 to the cam plates 5 and 6 of the motors 1 and 2 so that in the event of the vehicle negotiating a turn, the stroke of the motor driving the inner wheel will be increased and the stroke of the motor driving the outer wheel will be correspondingly decreased to maintain the flow of liquid substantially constant for a given pump output of the pump 7.

Preferably, the lever 14 is loaded (as shown) towards a central position by means of tension springs 16.

In the example shown in the drawing the connections between the motors 1 and 2 can be changed from series to parallel at will by means of valves 17 and 18. The valve 18 has a first position as shown in FIG. 2; in which a branch pipe 19 interconnecting the pipes 10 and 11 is closed, and a second position as shown in FIG. 4 in which the pipe 19 is open; and the valve 17 has a first position as shown in FIG. 3 in which the pipe 10 is open and a branch pipe 20 interconnecting the pipes 9 and 10 is closed and a second position as shown in FIG. 5 in which the pipe 10 is closed to the outlet of the motor 2, and the pipe 20 is open to the inlet of the motor 1. Moreover, the valves 17 and 18 are coupled so as to be operable together between their first and second positions. When the valves are in their first positions as shown in FIGS 2 and 3 the motors 1 and 2 are connected in series, and when they are in their second positions as shown in FIGS. 4 and 5 the motors are connected in parallel.

When the vehicle is traveling in a straight direction, the motors 1 and 2 drive the wheels 3 and 4 at the same speed, and there is an equal pressure drop between the inlet and outlet of each motor 1 and 2, with the result that the differential pressures in the opposite ends of each cylinder 12 are such that the interconnected pistons 13, which are of similar size, remain stationary in the positions shown in the drawing, and there is no tendency for the strokes of the motors to be varied.

However, when the vehicle is negotiating a turn, one of the wheels 3 and 4 is inner, and the other is outer, relative to the turn, whereupon the speed of the inner wheel is less than the speed of the outer wheel, with the result that the pressure drop between the inlet and outlet of the motor 1 or 2 connected to the inner wheel is reduced, and the differential pressures in the opposite ends of each cylinder 12 are such that the pistons 13 are moved in the direction for increasing the stroke of the motor connected to the inner wheel, and reducing the stroke of the motor connected to the outer wheel, until the vehicle re-assumes its straight travel, whereupon the pistons are returned to their previous positions by the pressures exerted thereon, and the motors drive the wheels 3 and 4 at the same speed.

As indicated above, when the valves 17 and 18 are in the positions shown in FIGS. 2 and 3, the fluid pressure from the pump 7 passes through the pipe 9 and the pipe 9' to the inlet of motor 2, and the exhaust from motor 2 passes through the pipe 10, the valve 17, and the pipe 10' to the inlet of the motor 1. The exhaust from motor 1 passes through pipe 11', valve 18 and pipe 11 to the intake of pump 7. This connection of the valves 17 and 18, as shown in FIGS. 2 and 3, provides for series operation of the motors 1 and 2, and during such operation the pistons 13, by reason of differential pressures on opposite sides thereof will operate to adjust the stroke of the motors 1 and 2 to provide for proper differential action thereof when the vehicle is rounding a curve.

With the valves 17 and 18 positioned as shown in FIGS. 4 and 5 for parallel operation of the motors 1 and 2, fluid pressure will flow from the pump 7 through the pipe 9 and pipe 9' to the inlet of motor 2. The exhaust of motor 2 will flow through pipe 10, pipe 19 and valve 18 to the intake 11 of the pump 7. Fluid pressure will also flow from the pump 7 through pipe 9, pipe 20, valve 17 and pipe 10' to the inlet of motor 1, and the exhaust from motor 1 will flow through pipe 11', valve 18 and pipe 11 to the intake of pump 7. Obviously, this will result in parallel operation of the motors 1 and 2, since the inlets thereof are individually supplied from the pump 7, and the outlets of both motors discharge directly to the intake of pump 7.

During parallel operation of the motors 1 and 2, the pistons 13 will be inoperative, due to the fact that the pressures on opposite sides thereof will be balanced, and consequently no movement of the pistons 13 will occur. As a result, the stroke of the motors 1 and 2 will remain constant during parallel operation. This does not, however, interfere with proper differential operation of the motors 1 and 2 when the vehicle is rounding a curve, since by reason of the parallel connection, if one motor requires less fluid than the other by reason of rotation at a different speed, the excess fluid available from the pump 7 will flow to the other motor, thereby providing for proper differential action.

It is to be noted that reverse movement of the vehicle may be conveniently provided by suitable operation of the hand lever 21 which operates to reverse the operation of the pump 7, in which case the pipe 9 becomes the intake to the pump 7, and the pipe 11 becomes the outlet thereof, which will result in reverse operation of the motors 1 and 2 with a consequent reversal of the vehicle driven thereby.

Having thus described my invention, what I claim as new and desire to secure by Letters Patent is:

1. For use in a vehicle provided with an engine, a hydraulic transmission mechanism of the kind specified, comprising in combination a pair of variable stroke hydraulic motors each provided with a liquid inlet and a liquid outlet, and with a movable stroke-varying member, a hydraulic pump, means interconnecting said pump and said motors for enabling said pump to supply motive liquid to said motors, a pair of pressure-responsive devices respectively associated with said motors so that variations in the liquid pressure drop between the inlet and outlet of each motor, due to variations in the speed of the latter, cause movements of the associated pressure-responsive device, and means interconnecting said pressure-responsive devices and the stroke-varying members of said motors so that movements of said pressure-responsive devices vary the strokes of said motors to maintain the liquid flow therethrough substantially constant for a given output of said pump.

2. A hydraulic transmission mechanism according to claim 1, wherein each of the hydraulic motors is of the swash-plate type having a stroke-varying member in the form of an angularly adjustable cam plate, and wherein each of the pressure-responsive devices comprises a pressure-responsive member in a chamber which communicates at opposite sides of said pressure-responsive member respectively with the inlet and outlet of the associated motor.

3. A hydraulic transmission mechanism according to claim 2, wherein the means interconnecting the pressure-responsive devices and the stroke-varying members of the hydraulic motors comprise a pair of interconnected parts respectively connected to said stroke-varying members so that when the stroke of one of said motors is reduced the stroke of the other of said motors is increased.

4. A hydraulic transmission mechanism according to claim 3, wherein the means interconnecting the hydraulic pump and the hydraulic motors include operatively interconnected valves which are movable between first positions in which said motors are connected in series with one another and with said pump, and second positions in which said motors are connected in parallel with one another and serially with said pump.

References Cited in the file of this patent
UNITED STATES PATENTS

| | | |
|---|---|---|
| 2,541,291 | Robinson | Feb. 13, 1951 |
| 2,541,292 | Robinson | Feb. 13, 1951 |
| 2,903,852 | Bottoms | Sept. 15, 1959 |